United States Patent
Gunn et al.

(10) Patent No.: US 10,733,302 B2
(45) Date of Patent: Aug. 4, 2020

(54) SECURITY VULNERABILITY ANALYTICS ENGINE

(71) Applicant: MasterCard International Incorporated, Purchase, NY (US)

(72) Inventors: Eric Gunn, St. Louis (MO); Martin Gonzalo Enriquez, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 173 days.

(21) Appl. No.: 15/843,884

(22) Filed: Dec. 15, 2017

(65) Prior Publication Data

US 2019/0188390 A1    Jun. 20, 2019

(51) Int. Cl.
*G06F 21/62* (2013.01)
*G06F 21/57* (2013.01)
*G06N 20/00* (2019.01)

(52) U.S. Cl.
CPC ........... *G06F 21/577* (2013.01); *G06N 20/00* (2019.01); *G06F 2221/034* (2013.01)

(58) Field of Classification Search
CPC ............. G06F 21/577; G06F 2221/034; G06F 21/6218; G06F 3/0637; G06F 21/44; G06F 3/067; G06F 12/0875; G06F 3/0659; G06F 3/0623; G06F 2212/60; G06F 2212/154; G06N 20/00; H04L 67/2842; H04L 67/06; H04L 67/2814; H04L 67/2823
See application file for complete search history.

(56) References Cited

U.S. PATENT DOCUMENTS

| 7,975,165 B2 | 7/2011 | Shneorson et al. |
| 8,312,549 B2 | 11/2012 | Goldberg et al. |
| 8,595,845 B2 | 11/2013 | Basavapatna et al. |
| 8,601,587 B1 | 12/2013 | Powell et al. |
| 8,769,179 B2 * | 7/2014 | Maynard ............... G06F 21/105 710/310 |
| 9,246,935 B2 | 1/2016 | Lietz et al. |
| 10,277,521 B2 * | 4/2019 | Abuelsaad .............. H04L 47/70 |
| 2003/0056116 A1 * | 3/2003 | Bunker ................... H04L 43/00 726/25 |
| 2005/0288939 A1 * | 12/2005 | Peled ...................... G06F 21/10 709/229 |
| 2009/0043621 A1 * | 2/2009 | Kershaw ................ G06Q 10/06 705/7.16 |

(Continued)

*Primary Examiner* — Abu S Sholeman

(57) ABSTRACT

Vulnerability data is classified as described herein. A finding object is created based on vulnerability data associated with a vulnerability finding and that finding object is populated with property values based on the vulnerability data. Technical owner rules associated with a plurality of technical owners are evaluated based on the property values of the finding object and a technical owner is assigned to the finding object based on the evaluated technical owner rules. Once a technical owner is assigned, the finding object is provided to a governance, risk, and compliance (GRC) module for distribution of the vulnerability finding to the assigned technical owner for remediation. Classification of vulnerability data using the described property values and technical owner rules provides an efficient, accurate, and automated way of distributing vulnerability findings of large, complex code bases to teams for remediation.

20 Claims, 5 Drawing Sheets

(56) References Cited

U.S. PATENT DOCUMENTS

| | | | | |
|---|---|---|---|---|
| 2010/0198799 A1* | 8/2010 | Krishnan | ............ | G06F 11/3696 |
| | | | | 707/702 |
| 2012/0054142 A1* | 3/2012 | Du | ........................... | G06N 5/02 |
| | | | | 706/47 |
| 2014/0331326 A1* | 11/2014 | Thakur | ............... | H04L 63/1433 |
| | | | | 726/25 |
| 2016/0080419 A1* | 3/2016 | Schiappa | ................ | H04L 63/20 |
| | | | | 726/1 |
| 2016/0112397 A1* | 4/2016 | Mankovskii | .......... | H04L 63/105 |
| | | | | 726/6 |

* cited by examiner

SECURITY VULNERABILITY ANALYTICS ENGINE

BACKGROUND

Efficient maintenance of large, complex code bases presents substantial challenges to organizations in the face of an enormous quantity and variety of potential security vulnerabilities. New vulnerabilities are discovered frequently, increasing the analysis and effort required in addressing them. Once a potential security vulnerability is known, a code base may be analyzed to identify if the vulnerability is present therein, but additional action must be taken to address and remediate the vulnerability once identified.

When a code base is sufficiently large and responsibility for parts of the code base is distributed across multiple technical owner teams, manually identifying the appropriate responsible technical owner of an identified vulnerability becomes a challenging and time-consuming task. In some cases, the number of identified vulnerabilities over time exceeds the capability of the organization to accurately and promptly distribute the vulnerabilities to the responsible technical owners. As a result, a backlog is of unassigned vulnerabilities is created, resulting in holes in the security of the code base that are not addressed in a timely manner. Secure maintenance of complex, distributed code bases requires a system of handling security vulnerabilities that can keep up with the rate of vulnerability discovery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for classifying vulnerability data is described, the method comprising creating a finding object based on vulnerability data associated with a vulnerability finding and populating that finding object with property values based on the vulnerability data. Then technical owner rules associated with a plurality of technical owners are evaluated based on the property values of the finding object and a technical owner is assigned to the finding object based on the evaluated technical owner rules. Finally, the finding object is provided to a governance, risk, and compliance (GRC) module for distribution of the vulnerability finding to the assigned technical owner for remediation.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

The computing devices and methods described below are configured to classify security vulnerability findings according to responsible technical owners. Based on vulnerability data associated with a vulnerability finding, a finding object is created and populated with property values. Technical owner rules associated with technical owners are evaluated based on the property values of the finding object and a technical owner is assigned to the finding object based on the evaluated technical owner rules. The finding object with the assigned technical owner is provided to a management module, such as a governance, risk, and compliance (GRC) module, for distribution of the vulnerability to the assigned technical owner for remediation. Additionally, a risk value or score may be assigned to the finding object based on evaluation of risk rules. The risk value or score represents a degree of risk presented by a vulnerability to the security of a system. Feedback regarding the assigned technical owner and/or risk value may be receive and the rules and/or property values may be adjusted in response based on machine learning techniques.

The use of automated, rules-based classification of vulnerabilities as described herein substantially improves the rate at which identified vulnerabilities are distributed in the systems described herein. In some cases, the rate of responsible owner identification is improved by approximately 2000% over other identification processes in which responsible owners are identified manually. The user effort required to ensure that vulnerabilities are accurately assigned is similarly reduced. As the classification system described herein is used, the accuracy of the classifications improves, further reducing the need for users to manually address issues that might arise due to incorrect classifications. Overall, security vulnerabilities are addressed more quickly, efficiently, and accurately in the described systems than in the existing systems, such as those that utilize manual classification of vulnerabilities. One result is a more secure, up-to-date code base.

This detailed description in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

Figure 1:
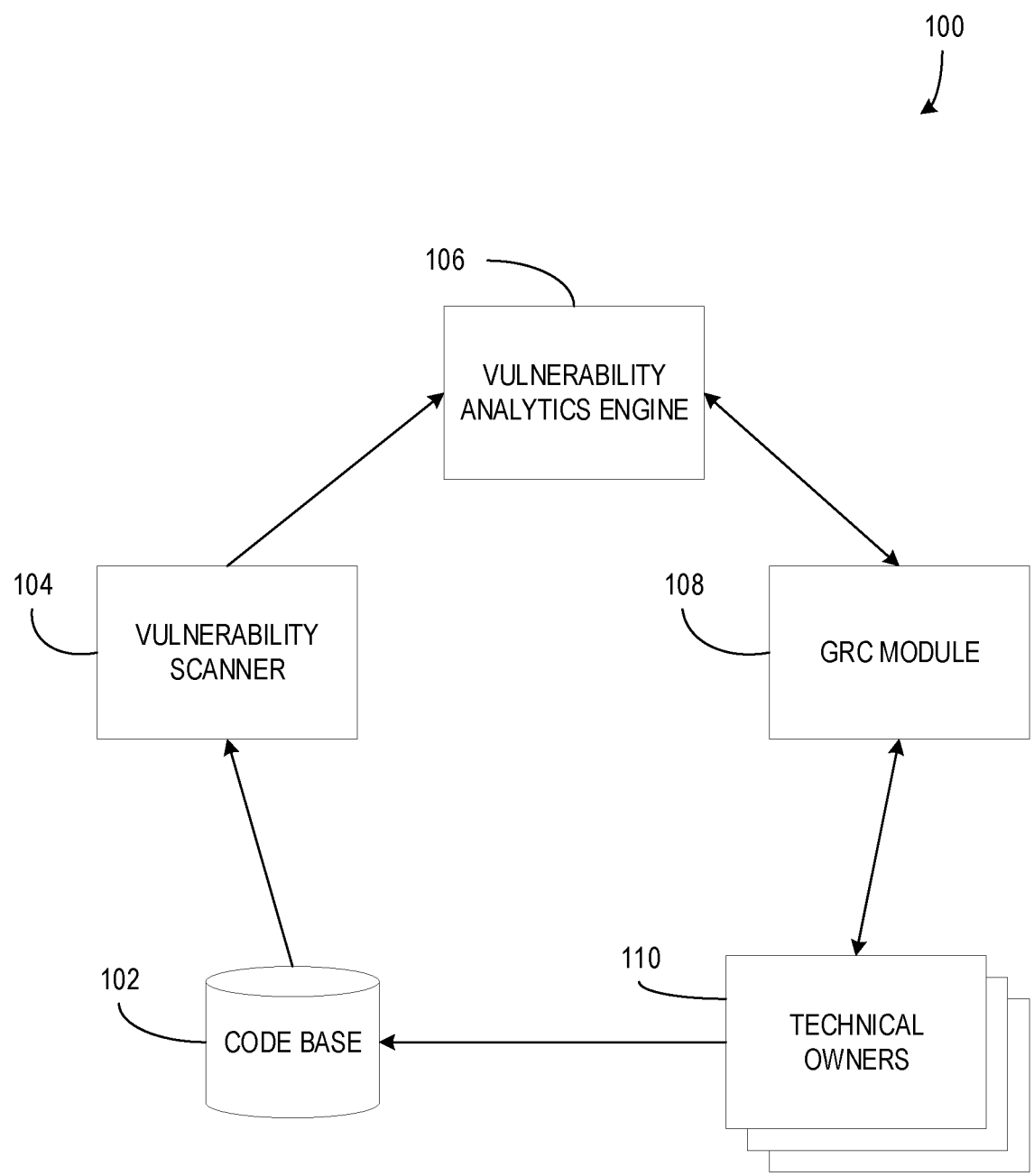
FIG. 1 is an exemplary block diagram illustrating a system for vulnerability analysis and remediation according to an embodiment.

FIG. 1 is an exemplary block diagram illustrating a system 100 for vulnerability analysis and remediation according to an embodiment. System 100 includes a code base 102, a vulnerability scanner 104, a vulnerability analytics engine (VAE) 106 a governance, risk, and compliance (GRC) module 108, and a plurality of technical owners 110.

The code base 102 is a collection of software code associated with an organization that may include some or all of the software code used by that organization, including external facing software such as web sites, software products sold to customers, software to perform financial transactions, etc. and/or internal facing software, such as software infrastructure tools or the like. The code base 102 may be divided into a variety of sections or divisions based on functionality, location, or other aspects, and each software section may be owned by one or more technical owners 110.

The vulnerability scanner 104 is a software component that accesses and scans the code base 102 for vulnerabilities and shares associated vulnerability data with the VAE 106. In some examples, the vulnerability scanner 104 communicates with multiple vulnerability scanning components distributed throughout a code base 102 and gathers vulnerability information from the vulnerability scanning components. The vulnerability scanner 104 stores and maintains information associated with known security vulnerabilities, such as names and/or identifiers of vulnerabilities, methods of detection, risk levels or types of risk associated with the vulnerabilities, etc. Further, the vulnerability scanner 104 may receive input from users regarding new or updated security vulnerabilities. The vulnerability scanner 104 may scan the code base 102 for the known security vulnerabilities at regular intervals (e.g., once a week, etc.), when instructed or requested to scan, or at other defined times. A scan may include checking for all known vulnerabilities or it may be focused on one or more particular vulnerabilities. For instance, the vulnerability scanner 104 may scan for all known vulnerabilities at a regular interval, but if previously unknown vulnerability information is provided to the vulnerability scanner 104, it may execute a focused scan for vulnerabilities associated with the previously unknown vulnerability information immediately, even if it is not time to scan based on the defined regular interval.

When the vulnerability scanner 104 outputs a vulnerability finding (e.g., an instance of a vulnerability, such as a remote code execution vulnerability identified by a security researcher, etc.), the data associated with the identified vulnerability finding is sent to the VAE 106. Alternatively, or additionally, the VAE 106 may request vulnerability finding data from the vulnerability scanner 104 at regular, intermittent, or periodic intervals. In some examples, the vulnerability scanner 104 may send groups or batches of vulnerability findings to the VAE 106 (e.g., the vulnerability scanner 104 may send finding data in a JavaScript Object Notation (JSON) file in response to a Representation State Transfer (REST) call from the VAE 106, etc.). The VAE 106 analyzes the vulnerability finding data and determines a responsible technical owner, as well as a potential risk level or risk type. The VAE 106 also generates properties associated with the vulnerability finding based on the vulnerability finding data for use during analysis. The VAE 106 is described in further detail below.

In some examples, the VAE 106 ingests many vulnerability findings from the vulnerability scanner 104 in groups or batches. Further, the VAE 106 may ingest and process groups of vulnerability findings in parallel to increase ingestion efficiency. For instance, a set of vulnerability findings may be ingested and processed in groups of 20,000 vulnerability findings by the VAE 106 in parallel to enhance performance of the VAE 106. Other vulnerability group sizes may be used by the VAE 106 are contemplated, depending on configuration of the VAE 106 and/or preferences of users of the VAE 106, etc.

Further, the VAE 106 may generate reporting data based on the processing of vulnerability findings. For instance, the VAE 106 may generate a report that provides a breakdown of the number of vulnerability findings assigned to each responsible owner and/or other statistical data that may be identified based on the vulnerability finding processing.

After the VAE 106 identifies a responsible technical owner, as well as any risk level or risk type, of a vulnerability finding, the VAE 106 sends the finding to the GRC module 108 or other management module for remediation. The GRC module 108 provides a ticketing system that can be used to track vulnerabilities as the vulnerabilities are being remediated or otherwise addressed by the technical owners 110. For instance, when the GRC module 108 receives, or ingests, a vulnerability finding, it may create a ticket associated with the finding for tracking it. The ticket may be provided to the responsible technical owner 110. The ticket includes information associated with the vulnerability so that the responsible technical owner 110 may begin to address the vulnerability. The ticket may also include one or more deadline dates for response to the ticket as well as a method of response to the ticket, in case the responsible technical owner 110 has been inaccurately assigned by the VAE 106. While the system 100 includes a GRC module 108, it should be understood that other management modules that provide similar functionality (e.g., handling risk, enforcing policies, etc.) are contemplated without departing from the description herein.

The technical owners 110 are bots, teams or groups of engineers, computer scientists, project managers, or other humans or artificial intelligence (AI) involved in maintaining sections of the code base 102. When a technical owner 110 is assigned a vulnerability by the GRC module 108 as described above, they may begin work to address the vulnerability. Further, technical owners 110 may interact with the GRC module 108 by confirming that they have received a vulnerability and confirming that they have fixed or otherwise addressed the vulnerability. The technical owners 110 are responsible for sections or divisions of the code base 102, and they may make changes or updates to their own sections of the code base 102 in response to vulnerability notifications from the GRC module 108. Data associated with technical owners 110 may be stored in a data structure associated with a component of the system 100 or as an independent component. New technical owners 110 may be introduced and current technical owners 110 may be updated and/or removed as necessary to maintain an accurate system 100.

Feedback may also be provided from the technical owners 110 back to the GRC module 108, which is then provided to the VAE 106. The VAE 106 may then be updated based on the feedback according to machine learning principles as described below to enhance the accuracy of the vulnerability classification. Additionally, technical owners 110 may also request a "re-scan" once they have addressed a vulnerability. A re-scan may be executed by the vulnerability scanner 104 when requested, and it may include rescanning a relevant portion of the code base for vulnerabilities. A technical owner 110 may include information regarding what code section(s) to scan and vulnerabilities to identify with their request so that the vulnerability scanner 104 can efficiently confirm that the vulnerability has been addressed. Requests for re-scans may be communicated from the GRC module 108, through the VAE 106, to the vulnerability scanner 104.

In some examples, the VAE 106 facilitates synchronization of vulnerability findings between the vulnerability scanner 104 and the GRC module 108. The VAE 106 may communicate between the vulnerability scanner 104 and the GRC module 108 to enforce status updates on progress of vulnerability findings as they are addressed. For instance, if technical owner 110 reports to the GRC module 108 that a finding has been addressed, the GRC module 108 may report to the VAE 106, which reports to the vulnerability scanner 104. The vulnerability scanner 104 may then maintain records associated with the addressed vulnerability finding based on the provided report (e.g., moving the vulnerability finding to a "mitigated" database, etc.).

Figure 2:
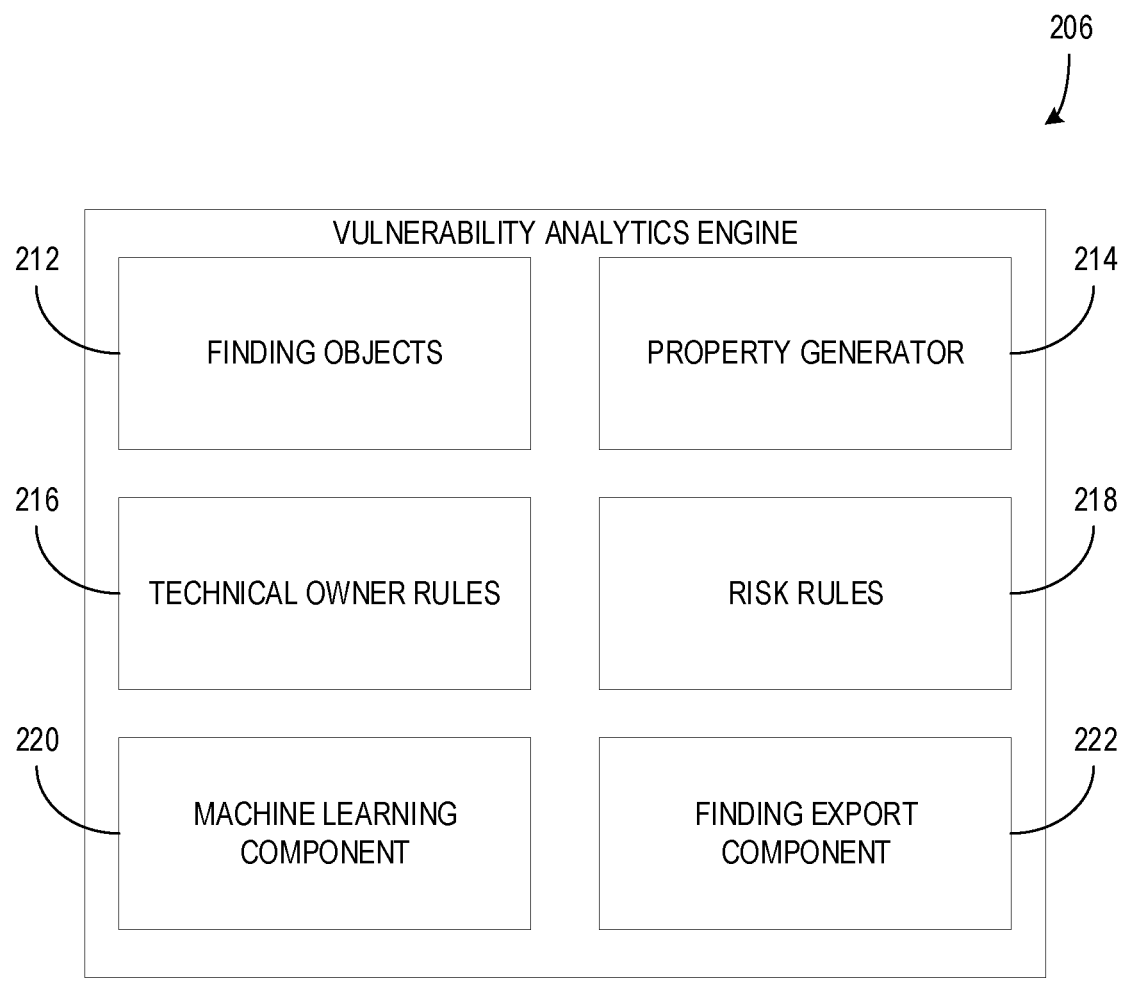
FIG. 2 is an exemplary block diagram illustrating a vulnerability analytics engine according to an embodiment.

FIG. 2 is an exemplary block diagram illustrating a vulnerability analytics engine (VAE) 206 according to an embodiment. The VAE 206 includes finding objects 212, a property generator 214, technical owner rules 216, risk rules 218, a machine learning component 220, and a finding export component 222. The finding objects 212 are data objects (e.g., objects associated with object oriented programming, etc.) that contain the vulnerability data and properties, or attributes, associated therewith. They may include a name and/or ID for identification. In some examples, an ID or key is generated for a finding object 212 when it is created and it may have a hashing function (e.g., a secure hashing algorithm such as SHA-256, etc.) applied to ensure that the ID is of a uniform length with other finding object IDs. Additionally, the finding object 212 may include an identifier associated with the vulnerability finding for which it was created. The vulnerability data may be in a table (e.g., a comma separated values (CSV) file, etc.) or other simple format, such that conversion or transformation of the data is necessary to transfer it into the finding object 212. Properties or attributes associated with the vulnerability finding may also be included based on vulnerability data received from the vulnerability scanner. Finding objects 212 may be populated with other properties and/or attributes by the property generator 214. Some example properties of finding objects include vulnerability types, environment variables, associated IP addresses, code identifiers of code that may be affected, dates and/or times associated with the vulnerability, effect(s) of the vulnerability, etc. For instance, a finding object may include an IP address property with a single IP address property value or an IP address list property with a list of IP addresses associated with the finding.

The property generator 214 generates property values, or attribute values, for finding objects 212 that have been created based on, or derived from, the vulnerability data. Property values may be integer values, letters, words or other string-type data, Boolean values, or the like. The property values may be copied directly from the vulnerability data in the case of basic properties, or compound or derived property values may be generated based on, or derived from, the vulnerability data and/or other property values using defined algorithms, equations, value mapping, or the like. For instance, a defined compound property may be generated by multiplying the values of two other properties. The defined compound property generated in this way may be found to be a strong indicator that the vulnerability finding should be assigned to a particular technical owner when the generated property value exceeds a defined threshold, so the compound property is generated for each finding object 212.

In another example, a property value of a defined property may be generated based on the presence of a defined combination of three vulnerability data values. When the three vulnerability data values are present, the property generator 214 generates the property value of the defined property for the associated finding object 212. For instance, the property may be set to "true" only when the three vulnerability data values are present, and "false" otherwise.

The technical owner rules 216 are rules that, when evaluated based on property values of a finding object, provide indications of probabilities that technical owners (e.g., technical owners 110, etc.) are responsible for the associated vulnerability finding. They may be based on keywords, key values, value threshold evaluation, etc. A technical owner rule 216 may provide an indication about a single technical owner or multiple technical owners, and the rule 216 may be evaluated based on a single finding object property or multiple finding object properties. For instance, a technical owner rule 216 may provide a strong indication that a technical owner responsible for a primary website in the code base is the most likely responsible technical owner when the finding object properties include the word "web" and/or "Internet".

The indications provided by an evaluated technical owner rule may be in the form of weight values that are associated with technical owners. In some examples, a technical owner object for each technical owner is created and/or cached prior to the evaluation process and the weight values of each technical owner are stored and tracked on the associated technical owner object. As each technical owner rule is evaluated, the weight values of the technical owners are incremented or otherwise increased based on the indications of the rule. For instance, a technical owner rule may evaluate whether the keyword "web" is present in the properties of the finding object and, if it is, add weight values to technical owners that are responsible for sections of the code base that deal with web-based software. Each technical owner may have the same weight value added or different weight values added, depending on a strength of the indication provided by the presence of the word "web". A technical owner that is responsible exclusively for web-based software may receive a significant weight value increase while a technical owner that is responsible for only a few web-based software projects may receive a small weight value increase. Once all of the technical owner rules have been evaluated, the most likely responsible technical owner may be the technical owner with the highest weight value. This most likely responsible technical owner is assigned to the finding object 212 prior to the finding being sent to a GRC module (e.g., GRC module 108, etc.).

Evaluation of a technical owner rule may include evaluating a plurality of properties for matching keywords, specific properties for defined values, properties for exceeding value thresholds, or a combination thereof. Combining multiple evaluations in a single technical owner rule may include an "and" combination such that all of the evaluations must be true to satisfy the technical owner rule, an "or" combination such that only one of the evaluations must be true to satisfy the technical owner rule, or a combination thereof. Other types of combinations may also be used, such as an "exclusive or" combination. In an example, at technical owner rule is configured to increment the weight value of a troubleshooting team by 10% if an urgency property of the vulnerability finding indicates a "high" level of urgency and the vulnerability finding was identified within the last 24 hours or if a code projects affected property includes one or more of the projects for which the troubleshooting team is responsible. The troubleshooting team receives the 10% weight value increase for any vulnerability that affects projects, tools, or other components for which they are responsible, but they also receive the weight value increase for high urgency vulnerabilities that have been recently identified, even if the vulnerability does not affect one of their code projects. As a result, the troubleshooting team may be more likely to be assigned urgent vulnerabilities, perhaps because they are better equipped to handle them than another team, because they are more available throughout the day/night, etc.

In some examples, technical owner rules may be in the form of keyword lists associated with each technical owner. The keywords are matched against the property values of a finding object and for each match, the technical owner associated with the keyword is more likely to be assigned as the responsible technical owner for the finding (e.g., by increasing weight value(s) of the technical owners or providing other indications, etc.). The technical owner rules may be in the form of a list of key-value pairs, with each keyword mapping to a technical owner, whose weight value may be increased. In an example, the technical owner rules include a list of IP addresses mapped to technical owners, such that the presence of an IP address in the property values of the finding object indicate that an associated technical owner may be the responsible technical owner.

The risk rules 218 are similar to the technical owner rules 216 in that evaluation of the risk rules 218 is based on property values of the finding object 212, but, when evaluated, they provide indications of levels of risk associated with the vulnerability finding. The indications of levels of risk may include a number value or score on a defined scale and/or a risk level classification such as "high", "medium", or "low", etc.

In some examples, the risk level of a finding object 212 may be provided in the vulnerability data from the vulnerability scanner, and in such cases, evaluation of the risk rules 218 may be unnecessary. However, even if a risk level is previously provided, the risk rules 218 of the VAE 206 may be evaluated to ensure that all of the finding object properties that may affect the risk level have been considered. For instance, a risk level provided by the vulnerability scanner may not account for a vulnerability that affects code sections which are internal and/or off-line. The risk level determined by the VAE 206 may be lower than the risk level provided by the vulnerability scanner as a result.

Further, the risk rules 218 may be evaluated prior to the evaluation of the technical owner rules 216 and the resulting risk level of the finding object 212 may be used as a finding object property value during technical owner rules 216 evaluation.

In addition to assigning the resulting risk level or score to the finding object 212, properties of the finding object 212 that resulted in the resulting risk level or score may also be highlighted or otherwise emphasized on the finding object 212. For instance, the name of a property that is the most significant contributor to a high-risk level or score may be added to the finding object as a "most significant risk contributor" property. Alternatively, or additionally, the risk rule or rules 218 that contributed to the resulting risk level may also be highlighted on the finding object 212 for later evaluation by the assigned technical owner.

In some examples, the technical owner rules and/or risk rules may be defined within the VAE 206 and/or users may be enabled to contribute custom technical owner rules and/or risk rules via an interface with the VAE 206. Custom technical owner rules and/or risk rules may be processed before, after, or at the same time as processing the defined technical owner rules and/or risk rules.

The interface of the VAE 206 may be any type of user interface, such as a command line interface or other text based interface, a graphical user interface (GUI), or the like.

The machine learning component 220 receives feedback based on classified vulnerability findings regarding whether the correct technical owner was assigned. The machine learning component 220 may be initialized with rules created manually by users and trained using accurate past data. The feedback may be from the technical owners (e.g., technical owners 110, etc.), for instance. The feedback is used by the machine learning component 220 to update or otherwise adjust the technical owner rules 216 and/or property generator 214 to improve the accuracy of the technical owner classification process described herein. In some examples, the property generator 214, technical owner rules 216, and/or the risk rules 218 are components of the machine learning component 220, such that the machine learning component 220 is configured to generate properties, evaluate technical owner rules and risk rules, and thereby determine a responsible technical owner for a vulnerability finding as described herein.

In some examples, the feedback may indicate that the assigned technical owner was incorrectly assigned. For instance, a user associated with an assigned technical owner reviews a vulnerability notification received from a GRC module and determines that a different technical owner should be responsible for the vulnerability. The user responds to the notification from the GRC module to report the incorrect assignment. Further, the user may suggest a more correct technical owner to which the vulnerability should be assigned. The GRC module may provide the user's feedback to the VAE 206.

Alternatively, or additionally, a "backup" technical owner may be assigned. For instance, each technical owner may be associated with one or more backup technical owners that are assigned vulnerability findings when a responsible technical owner has an excessive number of vulnerability findings already assigned. A vulnerability finding may also be assigned to a "backup" technical owner by assigning the vulnerability finding to the second most likely responsible technical owner based on the technical owner rules evaluation as described above.

When feedback indicates that a technical owner was incorrectly assigned, the machine learning component 220 may access the technical owner rules 216 to adjust how technical owners are assigned and/or access the property generator 214 to adjust how properties are generated. The adjustments may include reducing and/or increasing weight values assigned to technical owners based on evaluation of the technical owner rules 216. For instance, if a first technical owner was incorrectly assigned, one or more rules 216 that add weight value to the first technical owner may be adjusted to reduce the weight value added to the first technical owner. Alternatively, or additionally, if the feedback indicates a second technical owner that should have been assigned and that indication is confirmed correct, technical owner rules 216 that add weight value to the second technical owner may be adjusted to increase the weight value added to the second technical owner. The technical owner rules 216 that are adjusted may be rules that are identified as having contributed significantly to the incorrect technical owner assignment and/or rules that are identified as having contributed too little to a correct technical owner assignment instead.

Other elements of technical owner rules 216 may also be adjusted, such as property value thresholds or matching property values that are evaluated.

In some examples, the machine learning component 220, in conjunction with the technical owner rules 216, risk rules 218, and other components of the VAE 206, may make use of a k-nearest neighbors algorithm and/or a naïve Bayes classifier technique to classify and learn, improving the accuracy with which technical owners are assigned to vulnerability findings. Further, use of other machine learning techniques understood by a person of ordinary skill in the art are also contemplated without departing from the description herein.

In some examples, the machine learning component 220 comprises a trained regressor such as a random decision forest, directed acyclic graph, support vector machine, neural network, or other trained regressor. The trained regressor may be trained using the input and feedback data described above. Examples of trained regressors include a convolutional neural network and a random decision forest. It should further be understood that the machine learning component 220, in some examples, may operate according machine learning principles and/or techniques known in the art without departing from the systems and/or methods described herein.

The machine learning component 220 may be available locally at the VAE 206. In alternative examples, the machine learning component 220 may be disposed at another computing device (e.g., a networked device associated with a cloud service, etc.) which receives and processes the data from the VAE 206.

The machine learning component 220 is arranged to execute the methods described herein to determine property value, technical owner rule, and risk rule adjustments in a manner which allows for improved performance when classifying vulnerability findings at the VAE 206.

In an example, the machine learning component 220 or other machine learning engine may make use of training data pairs when applying machine learning techniques and/or algorithms. Millions of training data pairs (or more) may be stored in a machine learning data structure. In some examples, a training data pair includes an input or feedback data value paired with a technical owner rule adjustment value. The pairing of the two values demonstrates a relationship between the input or feedback data value and the technical owner rule adjustment value that may be used by the machine learning component 220 to determine future technical owner rule adjustments according to machine learning techniques and/or algorithms.

The findings export component 222 prepares completed finding objects 212 for export to a GRC module (e.g., GRC module 108, etc.). This may include breaking down the object into another form or file type. For instance, data of finding objects 212 may be copied to a separate finding data structure prior to being exported to the GRC module. The finding data structure may be sorted or arranged as necessary to streamline the export process. Further, the findings export component 222 may collect completed findings in finding objects 212 or in a finding data structure and batch them together for export to the GRC module in groups. Exporting the findings may include uploading the finding data structure to a file share location that can be accessed by the GRC module.

Figure 3:
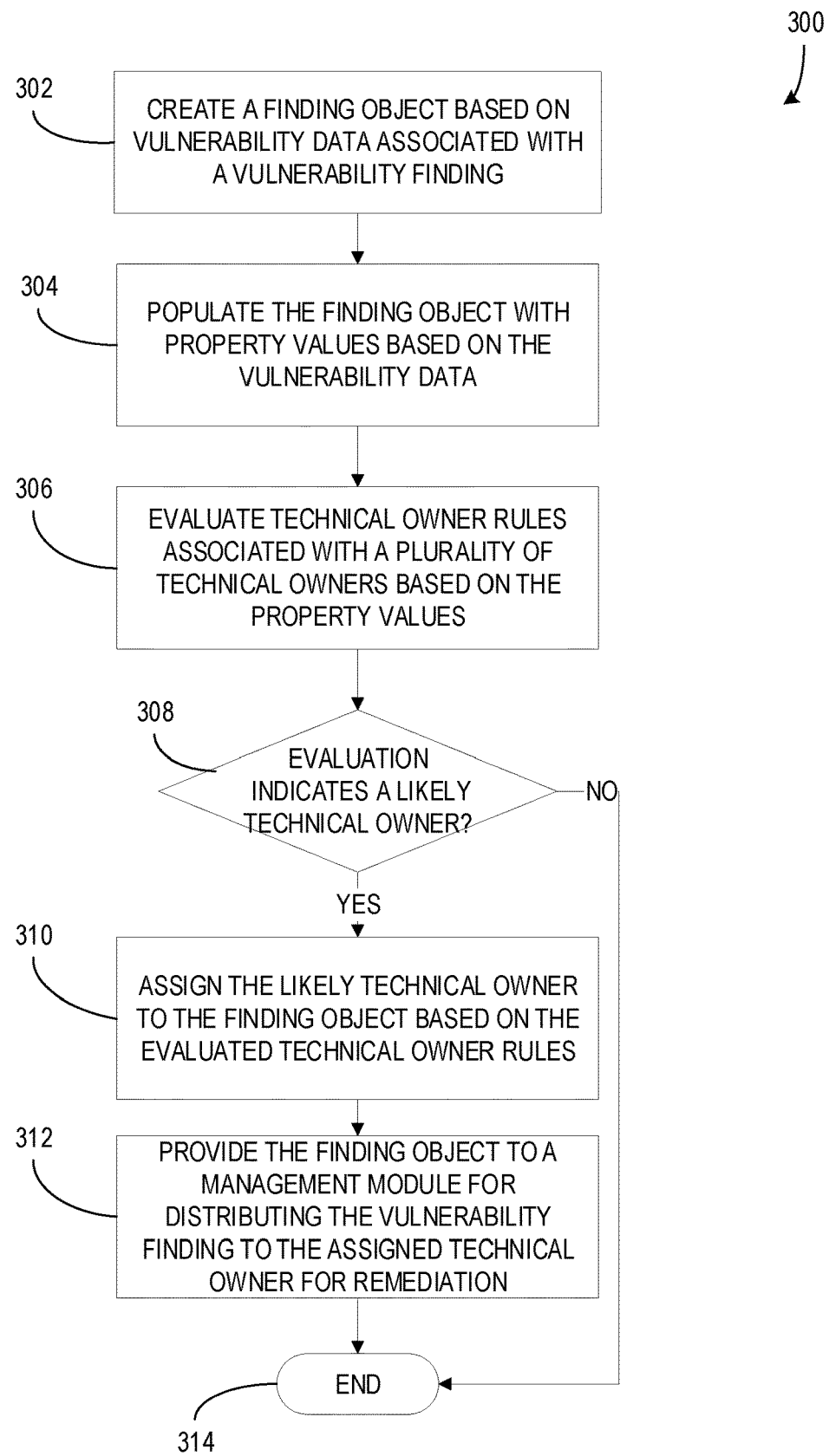
FIG. 3 is an exemplary flow chart illustrating a method of analyzing and classifying vulnerability data according to an embodiment.

FIG. 3 is an exemplary flow chart illustrating a method 300 of analyzing and classifying vulnerability data according to an embodiment. The method 300 may be executed by a Vulnerability Analysis Engine (VAE) (e.g., VAE 206, etc.) on a server, personal computer, or other similar computing devices. At 302, a finding object (e.g., finding object 212, etc.) based on vulnerability data associated with a vulnerability finding. Creating the finding object may include creating a blank finding object, creating an identifier for the finding object, and associating the vulnerability data with the finding object. At 304, the finding object is populated with property values based on the vulnerability data. The property values may be populated directly from the vulnerability data into appropriate properties. Further, property values of some properties may be generated based on the vulnerability data and/or other property values. The generated property values may be generated using algorithms, equations, or other methods of combining other property values and vulnerability data.

At 306, technical owner rules (e.g., technical owner rules 216, etc.) associated with a plurality of technical owners are evaluated based on the property values of the finding object. Technical owner rules may be evaluated based on keywords, key values, value thresholds, or the like, as described above.

In some examples, the technical owner rules are first cached into memory entirely before evaluation (e.g., the technical owner rules are identified in a database via an SQL query and cached into memory at runtime, etc.). Further, multiple finding objects may be evaluated in succession once the technical owner rules are cached to enhance efficiency. Each of the technical owner rules may be evaluated for each finding object.

If, at 308, the evaluation indicates a likely responsible technical owner, the likely responsible technical owner is assigned to the finding object at 310. If a likely responsible technical owner is not indicated by the evaluation of the technical owner rules, the process ends at 314. A likely responsible technical owner may not be indicated in the case where two or more technical owners are tied for likelihood of responsibility for the vulnerability finding. Alternatively, or additionally, there may be an indication threshold, or weight value threshold, that must be matched or exceeded by at least one technical owner in order for the evaluation to indicate a technical owner as likely responsible.

Assigning the likely technical owner to the finding object at 310 may include, for instance, setting a name or other identifier of the technical owner as a property value for a "responsible technical owner" property of the finding object. In addition to assigning the likely technical owner, in some examples, a risk level or score may be assigned to the finding object based on evaluated risk rules as described above.

At 312, the finding object is provided to a management module (e.g., GRC module 108, etc.) for distribution of the vulnerability finding to the assigned technical owner for remediation. The finding object may be exported to the management module alone or in a batch of multiple finding objects. Further, as described above, the finding object may be altered or transformed into other data formats or structures prior to transfer to the management module. Once the finding object has been provided to the management module, the process ends at 314.

Figure 4:
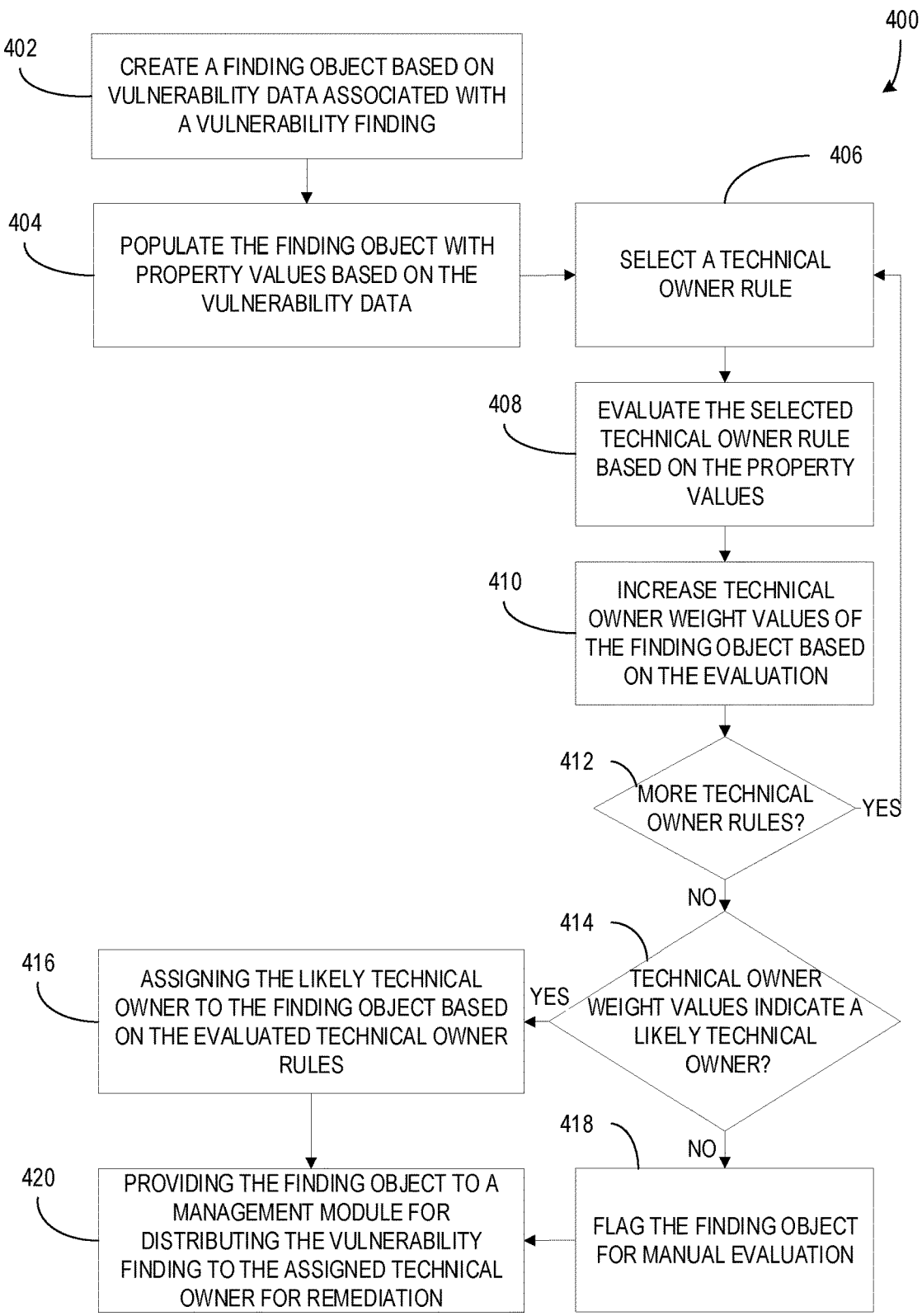
FIG. 4 is an exemplary flow chart illustrating a method of analyzing and classifying vulnerability data using technical owner rules according to an embodiment.

FIG. 4 is an exemplary flow chart illustrating a method 400 of analyzing and classifying vulnerability data using technical owner rules according to an embodiment. The method 400 may be executed by a Vulnerability Analysis Engine (VAE) (e.g., VAE 206, etc.) on computing devices described above with respect to method 300. At 402, a finding object is created based on vulnerability data associated with a vulnerability finding and, at 404, the finding object is populated with property values based on the vulnerability data as described above.

At 406, a technical owner rule is selected from a list or group of technical owner rules. The list of technical owner rules may include all the technical owner rules currently associated with the VAE. Technical owner rules may be selected in an order based on technical owner rule identifiers or other arrangement of rules. At 408, the selected technical owner rule is evaluated based on the property values of the finding object. Based on the evaluation, technical owner weight values are increased at 410. In some examples, the weight value of one technical owner is increased per evaluated rule, but in other examples, a technical owner rule may cause multiple technical owner weight values to increase. The technical owner rules are evaluated as described above.

At 412, if there are more technical owner rules that have not been evaluated, another technical owner rule is selected at 406. Alternatively, if there are no technical owner rules left to evaluate, at 414, a likely technical owner is determined based on technical owner weight values if possible. For instance, the technical owner with the highest weight value after evaluation of all of the technical owner rules may be indicated as the likely technical owner of the vulnerability finding.

If a likely technical owner is indicated at 414, the likely technical owner is assigned to the finding object based on the technical owner rules at 416 and the finding object is provided to a management module for distribution to the assigned technical owner at 420 as described above. Alternatively, a likely technical owner is not indicated based on the technical owner weight value at 414, the finding object is flagged for manual evaluation at 418.

Flagged finding objects may be added to a queue and evaluated by a technician, engineer, or other user of the system. Once the user has evaluated the finding object and assigned a technical owner, the finding object is provided to the GRC module for distribution to the assigned technical owner at 420.

Additional Example Scenarios

Aspects of the disclosure enable various additional scenarios, such as next described.

In an example, a vulnerability finding is identified in a code base by a vulnerability scanner. The associated vulnerability data is provided to the VAE by the vulnerability scanner, and the VAE creates a finding object as described herein and analyzes it to classify it. Keywords from the property values of the finding object are compared to the technical owner rules to identify the responsible technical owner. In particular, keywords including a name of a software class, a zip code of a location, and a phrase "human resources" are compared against the technical owner rules, which, as a result, indicate that the likely responsible technical owner is an engineering team based at the location that is responsible for a human resources software tool that includes the named software class. The engineering team is assigned as the technical owner of the vulnerability finding and then the finding is provided to a GRC module. The GRC module distributes the vulnerability finding to the engineering team and they confirm that the assignment was correct. The engineering team successfully addresses the vulnerability in the configuration of the human resources software tool. The engineering team may then request a "rescan" of the code base to confirm that the vulnerability is fixed in the human resources tool.

In another example, evaluation of the technical owner rules based on property values of a finding object indicate that three different technical owners may be the responsible technical owner of the finding object. During evaluation of the technical owner rules, each of the three technical owners received weight values based on the technical owner rules. The first technical owner received a weight value of 20, the second technical owner received a weight value of 25, and the third technical owner received a weight value of 30. Due to receiving the highest weight value, the third technical owner is assigned to the finding object as the responsible technical owner.

In another example, a vulnerability finding is assigned to a technical owner by a VAE and the vulnerability finding is distributed to the technical owner by a GRC module. The technical owner reports that they are not the responsible technical owner for the vulnerability finding to the GRC module. The GRC module provides the report to the VAE and a machine learning module of the VAE receives the report as feedback. The machine learning module analyzes the feedback in light of any other feedback it may have previously received and adjusts the technical owner rules associated with the incorrectly assigned technical owner so that it is less likely that technical owner will be assigned to similar vulnerabilities in the future.

Exemplary Operating Environment

Figure 5:
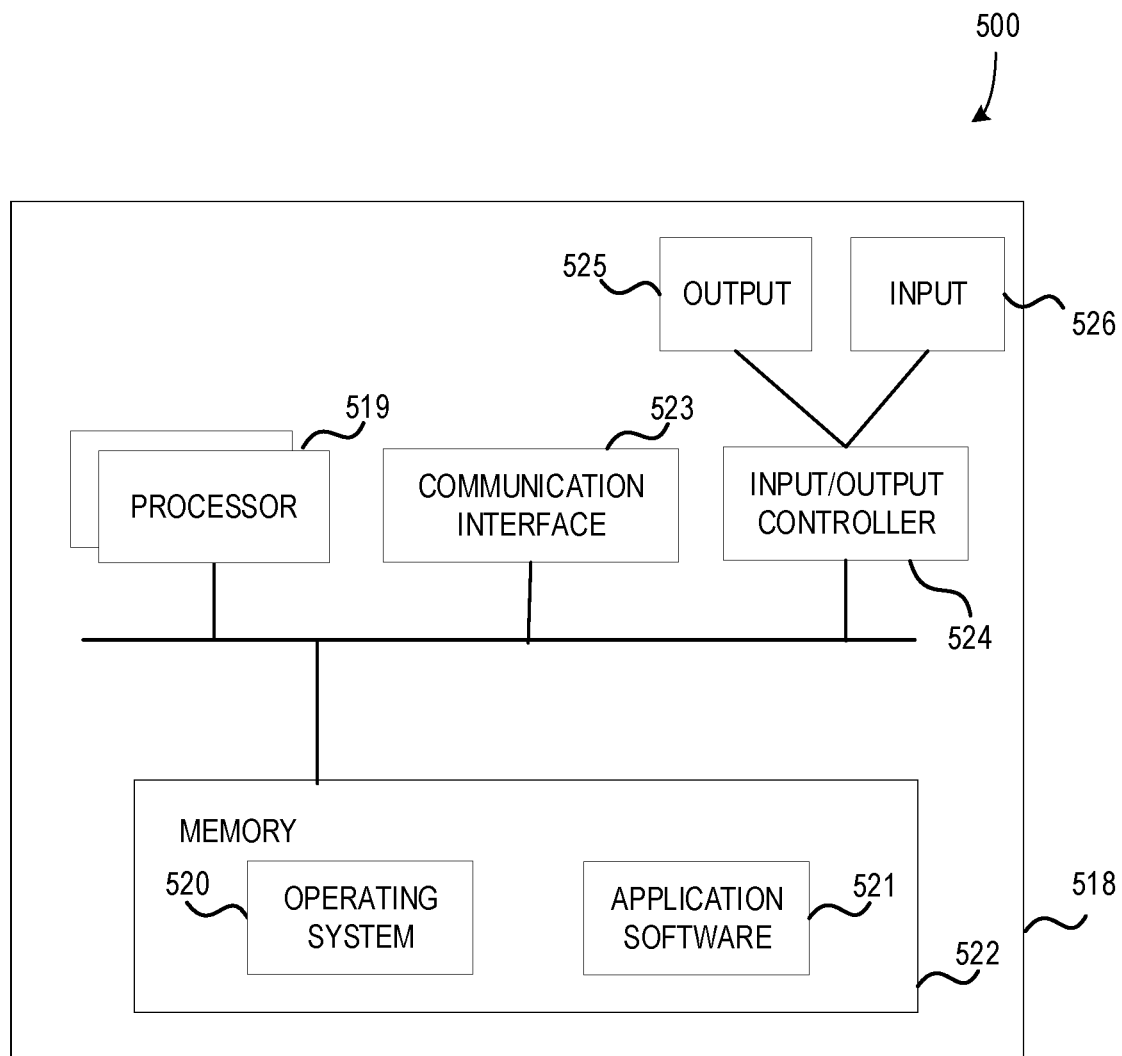
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, analyzing and classifying security vulnerability findings may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device (s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for classifying vulnerability data comprising:
at least one processor; and
at least one memory comprising computer program code, the at least one memory and the computer program code configured to, with the at least one processor, cause the at least one processor to:
create a finding object based on vulnerability data associated with a vulnerability finding;
populate the finding object with property values based on the vulnerability data;
evaluate technical owner rules associated with a plurality of technical owners based on the property values of the populated finding object;
assign a technical owner, from the plurality of technical owners, to the populated finding object based on the evaluated technical owner rules; and
provide the finding object to a management module for distribution of the finding object to the assigned technical owner for remediation.

The system described above, wherein evaluating technical owner rules associated with a plurality of technical owners based on the property values of the finding object includes assigning weight values to the plurality of technical owners; and
wherein assigning a technical owner to the finding object includes assigning a technical owner with a highest weight value to the finding object.

The system described above, further comprising maintaining keywords associated with each of the plurality of technical owners, and wherein evaluating technical owner rules associated with a plurality of technical owners based on the property values of the finding object comprises:
identifying keywords in the property values of the finding object;
comparing the identified keywords with the maintained keywords; and
based on the comparison, adjusting weight values assigned to one or more of the technical owners.

The system described above, the at least one memory and the computer program code configured to, with the at least one processor, further cause the at least one processor to:
evaluate risk rules based on the property values of the finding object; and
assign a risk level to the finding object based on the evaluated technical owner rules.

The system described above, the at least one memory and the computer program code configured to, with the at least one processor, further cause the at least one processor to:
receive feedback associated with the assigned technical owner to the finding object;
input the received feedback to a machine learning component; and receive, from the machine learning component, an update to at least one of the technical owner rules.

The system described above, wherein populating the finding object with property values based on vulnerability data comprises:

copying a first set of property values from the vulnerability data;

generating a second set of property values based on combinations of property values from the first set of property values; and populating the finding object with the generated second set of property values.

The system described above, wherein providing the finding object to a management module for distributing the vulnerability finding to the assigned technical owner includes storing the finding object in a finding data structure with a plurality of other finding objects and uploading the finding data structure to a file share location that is accessible to a governance, risk, and compliance (GRC) module.

A computerized method for classifying vulnerability data, the method comprising:

creating a finding object based on vulnerability data associated with a vulnerability finding;

populating the finding object with property values based on the vulnerability data;

evaluating technical owner rules associated with a plurality of technical owners based on the property values of the populated finding object;

assigning a technical owner, from the plurality of technical owners, to the populated finding object based on the evaluated technical owner rules; and providing the finding object to a management module for distribution of the vulnerability finding to the assigned technical owner for remediation.

The computerized method described above, wherein evaluating technical owner rules associated with a plurality of technical owners based on the property values of the finding object includes assigning weight values to the plurality of technical owners; and wherein assigning a technical owner to the finding object includes assigning a technical owner with a highest weight value to the finding object.

The computerized method described above, further comprising maintaining keywords associated with each of the plurality of technical owners, and wherein evaluating technical owner rules associated with a plurality of technical owners based on the property values of the finding object comprises:

identifying keywords in the property values of the finding object;

comparing the identified keywords with the maintained keywords; and based on the comparison, adjusting weight values assigned to one or more of the technical owners.

The computerized method described above, further comprising:

evaluating risk rules based on the property values of the finding object; and assigning a risk level to the finding object based on the evaluated technical owner rules.

The computerized method described above, further comprising:

receiving feedback associated with the assigned technical owner to the finding object;

inputting the received feedback to a machine learning component; and receiving, from the machine learning component, an update to at least one of the technical owner rules.

The computerized method described above, wherein populating the finding object with property values based on vulnerability data comprises:

copying a first set of property values from the vulnerability data;

generating a second set of property values based on combinations of property values from the first set of property values; and populating the finding object with the generated second set of property values.

The computerized method described above, wherein providing the finding object to a management module for distributing the vulnerability finding to the assigned technical owner includes storing the finding object in a finding data structure with a plurality of other finding objects and uploading the finding data structure to a file share location that is accessible to a governance, risk, and compliance (GRC) module.

One or more computer storage media having computer-executable instructions for classifying vulnerability data that, upon execution by a processor, cause the processor to at least:

create a finding object based on vulnerability data associated with a vulnerability finding;

populate the finding object with property values based on the vulnerability data;

evaluate technical owner rules associated with a plurality of technical owners based on the property values of the populated finding object;

assign a technical owner, from the plurality of technical owners, to the populated finding object based on the evaluated technical owner rules; and provide the finding object to a management module for distribution of the vulnerability finding to the assigned technical owner for remediation.

The one or more computer storage media described above, wherein evaluating technical owner rules associated with a plurality of technical owners based on the property values of the finding object includes assigning weight values to the plurality of technical owners; and wherein assigning a technical owner to the finding object includes assigning a technical owner with a highest weight value to the finding object.

The one or more computer storage media described above, further comprising maintaining keywords associated with each of the plurality of technical owners, and wherein evaluating technical owner rules associated with a plurality of technical owners based on the property values of the finding object comprises:

identifying keywords in the property values of the finding object;

comparing the identified keywords with the maintained keywords; and based on the comparison, adjusting weight values assigned to one or more of the technical owners.

The one or more computer storage media described above, wherein the computer-executable instructions for classifying vulnerability data, upon execution by a processor, further cause the processor to at least:

evaluate risk rules based on the property values of the finding object; and assign a risk level to the finding object based on the evaluated technical owner rules.

The one or more computer storage media described above, wherein the computer-executable instructions for classifying vulnerability data, upon execution by a processor, further cause the processor to at least:

receive feedback associated with the assigned technical owner to the finding object;

input the received feedback to a machine learning component; and receive, from the machine learning component, an update to at least one of the technical owner rules.

The one or more computer storage media described above, wherein populating the finding object with property values based on vulnerability data comprises:

copying a first set of property values from the vulnerability data;

generating a second set of property values based on combinations of property values from the first set of property values; and populating the finding object with the generated second set of property values.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for analyzing and classifying security findings based on associated properties. The illustrated one or more processors 519 together with the computer program code stored in memory 522 constitute exemplary processing means for evaluating rules based on properties of security findings to classify the security findings.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for classifying vulnerability data comprising:
at least one processor; and
at least one memory comprising computer program code, the at least one memory and the computer program code configured to, with the at least one processor, cause the at least one processor to:
create a finding object based on vulnerability data associated with a vulnerability finding;
populate the finding object with property values based on the vulnerability data;
evaluate technical owner rules associated with a plurality of technical owners based on the property values of the populated finding object, said evaluating including assigning weight values to the plurality of technical owners by:
identifying keywords in the property values of the populated finding object;
comparing the identified keywords with keywords associated with each of the plurality of technical owners; and
based on the comparison, adjusting weight values assigned to one or more of the plurality of technical owners;
assign a technical owner, from the one or more of the plurality of technical owners, to the populated finding object based on the evaluated technical owner rules; and
provide the finding object to a management module for distribution of the finding object to the assigned technical owner for remediation.

2. The system of claim 1, wherein assigning a technical owner to the finding object includes assigning a technical owner with a highest weight value to the finding object.

3. The system of claim 1, wherein a weight value associated with a technical owner is adjusted based on at least one of the property values of the finding object.

4. The system of claim 1, the at least one memory and the computer program code configured to, with the at least one processor, further cause the at least one processor to:
evaluate risk rules based on the property values of the finding object; and
assign a risk level to the finding object based on the evaluated risk rules.

5. The system of claim 1, the at least one memory and the computer program code configured to, with the at least one processor, further cause the at least one processor to:
receive feedback associated with the assigned technical owner to the finding object;

input the received feedback to a machine learning component; and receive, from the machine learning component, an update to at least one of the technical owner rules.

6. The system of claim 1, wherein populating the finding object with property values based on vulnerability data comprises:

copying a first set of property values from the vulnerability data;

generating a second set of property values based on combinations of property values from the first set of property values; and populating the finding object with the generated second set of property values.

7. The system of claim 1, wherein providing the finding object to a management module for distributing the vulnerability finding to the assigned technical owner includes storing the finding object in a finding data structure with a plurality of other finding objects and uploading the finding data structure to a file share location that is accessible to a governance, risk, and compliance (GRC) module.

8. A computerized method for classifying vulnerability data, the method comprising:

creating a finding object based on vulnerability data associated with a vulnerability finding;

populating the finding object with property values based on the vulnerability data;

evaluating technical owner rules associated with a plurality of technical owners based on the property values of the populated finding object, said evaluating including assigning weight values to the plurality of technical owners by:

identifying keywords in the property values of the populated finding object;

comparing the identified keywords with keywords associated with each of the plurality of technical owners; and based on the comparison, adjusting weight values assigned to one or more of the plurality of technical owners;

assigning a technical owner, from the one or more of the plurality of technical owners, to the populated finding object based on the evaluated technical owner rules; and providing the finding object to a management module for distribution of the vulnerability finding to the assigned technical owner for remediation.

9. The computerized method of claim 8, wherein assigning a technical owner to the finding object includes assigning a technical owner with a highest weight value to the finding object.

10. The computerized method of claim 8, wherein assigning the technical owner comprises assigning a backup technical owner, wherein the backup technical owner is a second most likely responsible technical owner based on the evaluated technical owner rules.

11. The computerized method of claim 8, further comprising:

evaluating risk rules based on the property values of the finding object; and assigning a risk level to the finding object based on the evaluated risk rules.

12. The computerized method of claim 8, further comprising:

receiving feedback associated with the assigned technical owner to the finding object;

inputting the received feedback to a machine learning component; and receiving, from the machine learning component, an update to at least one of the technical owner rules.

13. The computerized method of claim 8, wherein populating the finding object with property values based on vulnerability data comprises:

copying a first set of property values from the vulnerability data;

generating a second set of property values based on combinations of property values from the first set of property values; and populating the finding object with the generated second set of property values.

14. The computerized method of claim 8, wherein providing the finding object to a management module for distributing the vulnerability finding to the assigned technical owner includes storing the finding object in a finding data structure with a plurality of other finding objects and uploading the finding data structure to a file share location that is accessible to a governance, risk, and compliance (GRC) module.

15. One or more non-transitory computer storage media having computer-executable instructions for classifying vulnerability data that, upon execution by a processor, cause the processor to at least:

create a finding object based on vulnerability data associated with a vulnerability finding;

populate the finding object with property values based on the vulnerability data;

evaluate technical owner rules associated with a plurality of technical owners based on the property values of the populated finding object, said evaluating including assigning weight values to the plurality of technical owners by:

identifying keywords in the property values of the populated finding object;

comparing the identified keywords with keywords associated with each of the plurality of technical owners; and based on the comparison, adjusting weight values assigned to one or more of the plurality of technical owners;

assign a technical owner, from the plurality of technical owners, to the populated finding object based on the evaluated technical owner rules; and provide the finding object to a management module for distribution of the vulnerability finding to the assigned technical owner for remediation.

16. The one or more non-transitory computer storage media of claim 15, wherein assigning a technical owner to the finding object includes assigning a technical owner with a highest weight value to the finding object.

17. The one or more non-transitory computer storage media of claim 15, wherein adjusting the weight values comprises adjusting the weight values depending on a strength of indication provided by presence of the identified keywords in the keywords associated with the plurality of technical owners.

18. The one or more non-transitory computer storage media of claim 15, wherein the computer-executable instructions for classifying vulnerability data, upon execution by a processor, further cause the processor to at least:

evaluate risk rules based on the property values of the finding object; and assign a risk level to the finding object based on the evaluated risk rules.

19. The one or more non-transitory computer storage media of claim 15, wherein the computer-executable instructions for classifying vulnerability data, upon execution by a processor, further cause the processor to at least:
receive feedback associated with the assigned technical owner to the finding object;
input the received feedback to a machine learning component; and
receive, from the machine learning component, an update to at least one of the technical owner rules.

20. The one or more non-transitory computer storage media of claim 15, wherein populating the finding object with property values based on vulnerability data comprises:
copying a first set of property values from the vulnerability data;
generating a second set of property values based on combinations of property values from the first set of property values; and
populating the finding object with the generated second set of property values.

* * * * *